March 12, 1963  C. J. WELCKER ETAL  3,080,605
FOOD PROCESSING

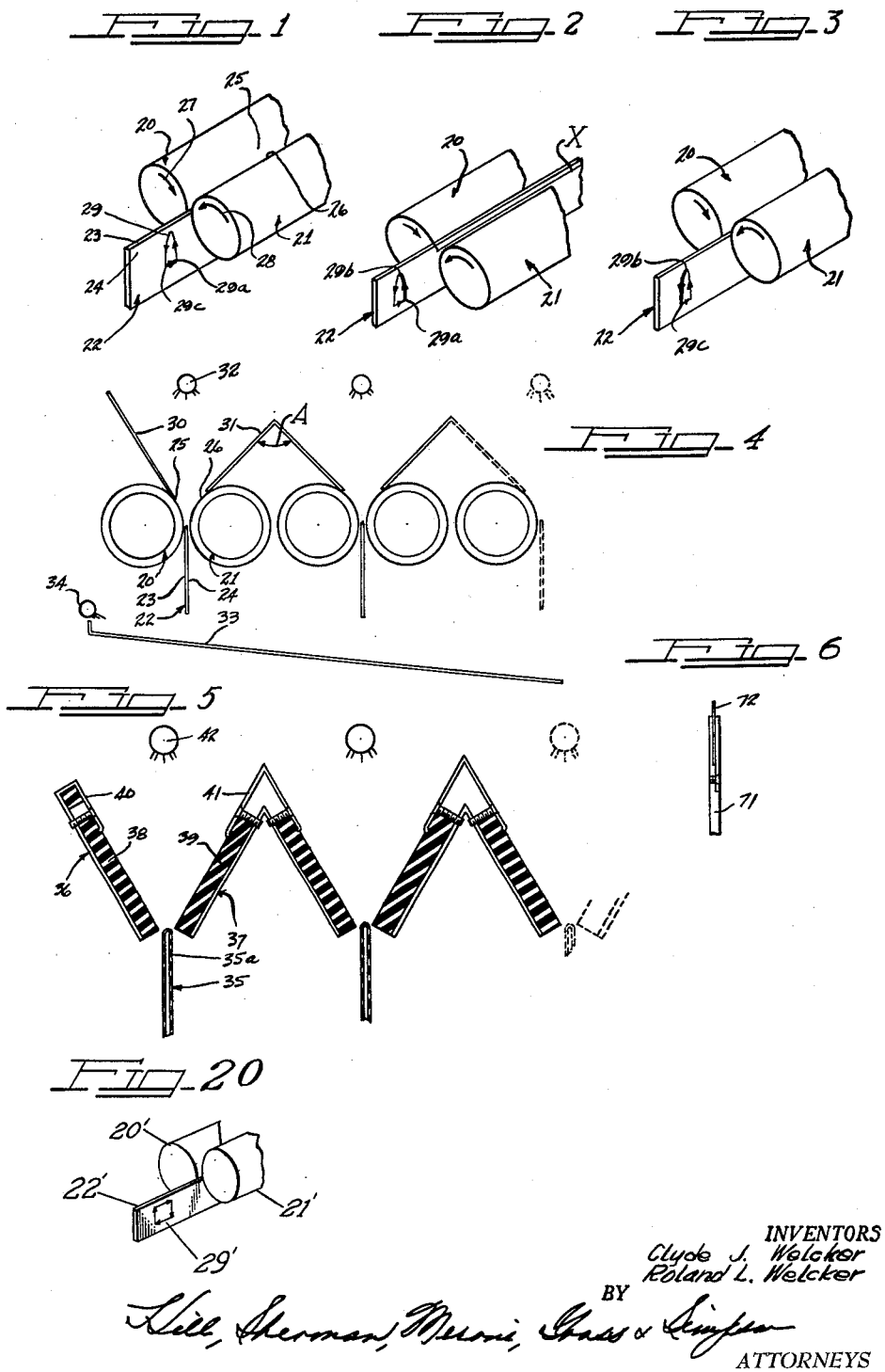

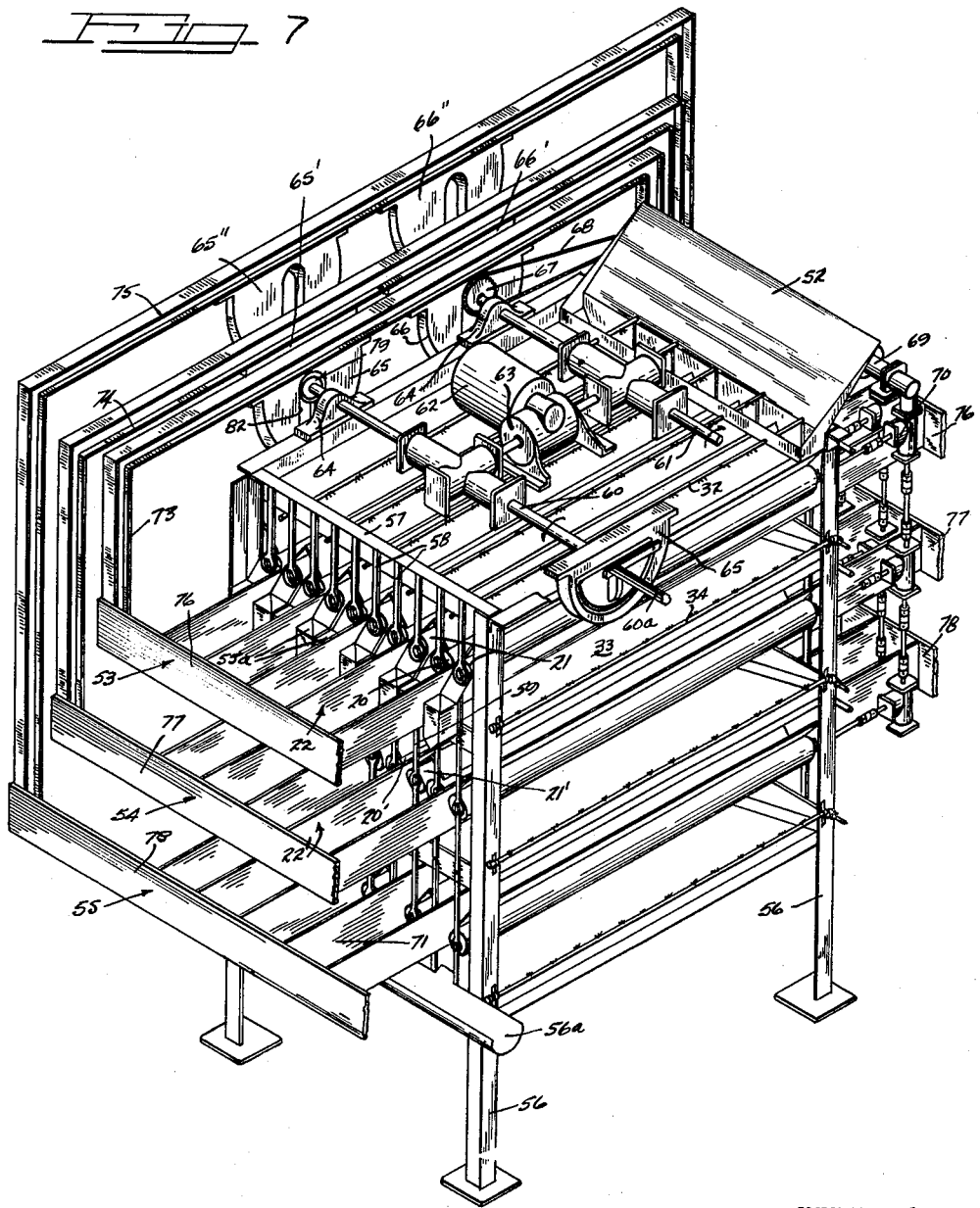

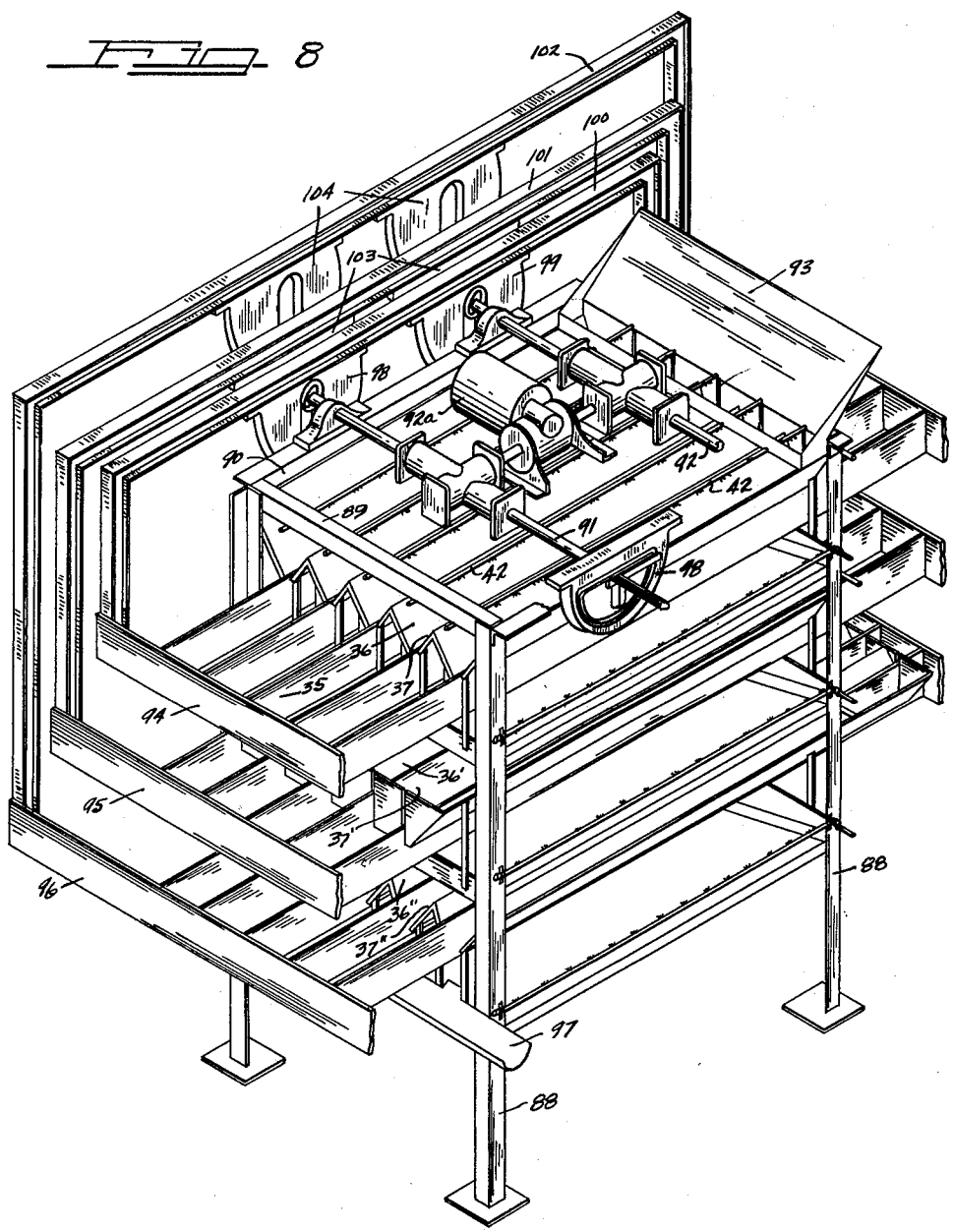

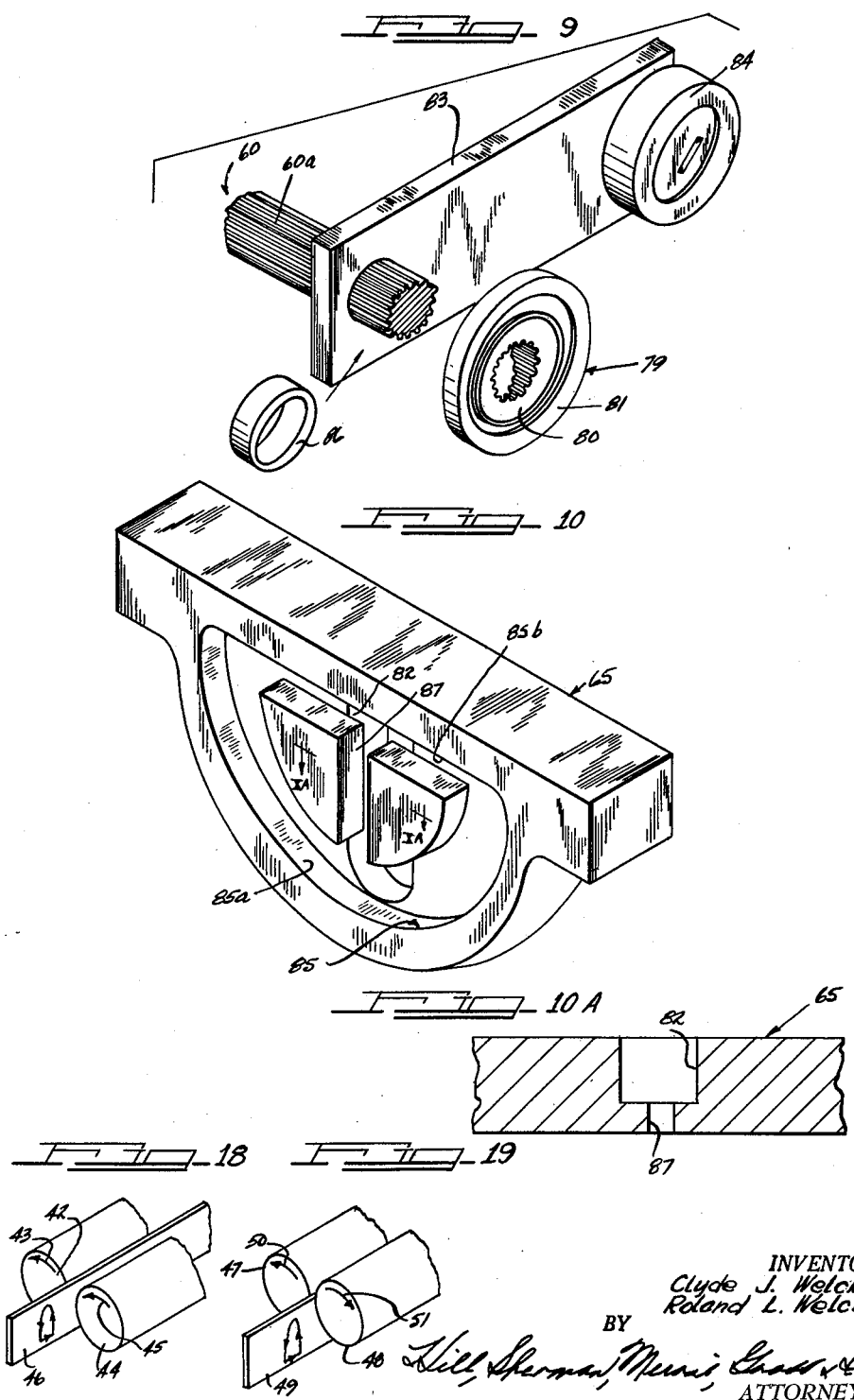

Filed Feb. 6, 1961  5 Sheets-Sheet 5

INVENTORS
Clyde J. Welcker
Roland L. Welcker
BY
ATTORNEYS

United States Patent Office 3,080,605
Patented Mar. 12, 1963

3,080,605
FOOD PROCESSING
Clyde J. Welcker and Roland L. Welcker, New Orleans, La., assignors to Welcker Corporation, New Orleans, La., a corporation of Louisiana
Filed Feb. 6, 1961, Ser. No. 87,425
25 Claims. (Cl. 17—2)

The present invention relates to improvements in machines for processing shrimp by removing their outer shells and separating the meat from the inedible shells and other inedible or objectionable portions of the shrimp.

More particularly the present invention contemplates the provision of a shrimp cleaning machine embodying a pair of horizontal parallel side members having inclined or sloping surfaces extending downwardly toward each other provided by members such as parallel plates or parallel rollers with a space between them. Mounted in the space between the rollers is a vertical center plate having flat planar side surfaces facing each of the rolls with each vertical side surface and the upper surface of each of the rolls providing first and second friction surfaces which engage the shell of the shrimp and remove it therefrom. The rolls are preferably rotated inwardly toward the plate and the plate is provided with a unique undulating (or tilted D-shaped) motion in a vertical plane wherein the plate moves up and down in an arcuate path and returns horizontally to its starting point. The horizontal movement is at a location recessed between the rollers so that the shrimp is at that point engaged by both rollers. These movements clean the shrimp and draw the trash downwardly and simultaneously move the shrimp horizontally along the rollers.

Accordingly an object of the invention is to provide an improved shrimp cleaning machine which is capable of performing an improved shrimp cleaning operation at commercial rates of speed.

A further object of the invention is to provide an improved mechanical shrimp cleaning machine having simplified movements for ease of driving and wherein the shrimp will be automatically cleaned and transported through the machine due to the motions of the parts.

A still further object of the invention is to provide a machine capable of cleaning shrimp by a frictional pinching action accomplishing the cleaning and transporting of the shrimp, and removal of the trash in a manner improved from machines heretofore used and in which the machine is relatively simple and inexpensive to make, operate and maintain.

A feature of the machine is its utilization of the inherent physical characteristics of the shrimp body and shell to the advantage of the cleaning process in order to effect a more complete and uniform removal of the inedible and objectionable portions of the shrimp. It has been noted that in the effect of hand cleaning of shrimp the fingers manually employ pinching, pulling, sliding and unravelling actions. In the instant invention the desirable manual operations of cleaning shrimp are utilized and duplicated with the employment of friction forces and the friction forces and their reactions are utilized in beheading, peeling, cleaning and finish processing the shrimp. It is to be noted that the shrimp as a whole is a heterogeneous structure including a body, a neck, a mid-section, and tail meat, with head cavity components, with a shell, and with appendages, feelers, pincers and legs. The appendages to the body possess elastomeric properties of flexibility but lack high synergistic response resiliency. Their cross sections are small as compared with the other parts of the shrimp and this is taken advantage of by being easily engaged by the machine components. The shell is of a dense material, stiff in comparison to the other parts and possesses limited elastomeric properties of flexibility and some synergistic response due to the shape or form when curved. The degree of resiliency due to curvature is slight and the elastic modulus is very low and it does not take too much force to overcome this resiliency. The head shell is only slightly resilient due to its shape and the application of force easily flattens it. The inner soft mushy components add little or nothing to the resiliency of the shell structure and once flattened they remain squashed. The body meats differ markedly from the preceding components in that they have inner elastomeric properties, and in addition to flexibility have inherent synergistic response to deformation and a higher elastic modulus making them more elastic. The surface of the body meat is smooth and moist and the addition of water tends to reduce the coefficient of friction of the body meat surface with the machine surfaces and increases the natural differences and values of coefficient of the smooth meat and shell. The shell also has a degree of roughness, nicks, barbs and sharp edges. In the application of frictional forces in the processing of shrimp the stresses produce strains including tension in shell segment joints to cause parting, tension on neck gristle to cause separation, shear in interface of shell and body meat to cause loosening, shear in sliding the loosened shell from the body meat, compression on the head to cause squashing and compression on the appendages including the feelers, legs, tail flippers and so forth, and compression of the shell and appendages to force them into a space but at the same time not accommodating the body meat.

Other objects, advantages and features will become more apparent with the teaching of the principles of the invention in connection with the disclosure of the preferred embodiments thereof in the specification, claims and drawings, in which:

FIGURES 1 through 3 are diagrammatic views shown in perspective illustrating the motions and relative positions of the parts which directly engage the shrimp;

FIGURE 4 is an end elevational view of the rollers of the cleaning machine shown in somewhat schematic form;

FIGURE 5 is a vertical sectional view of stationary side surfaces of the cleaning machine shown in somewhat schematic form and illustrating a modified form of the invention;

FIGURE 6 is a detailed elevational view of an end of a center plate near the discharge end of the machine;

FIGURE 7 is an overall perspective view of a shrimp cleaning machine embodying the principles of the present invention;

FIGURE 8 is an over-all perspective view of a machine showing a modified form of the invention;

FIGURE 9 is an exploded fragmental detail view of a portion of the drive arrangement of the machine;

FIGURE 10 is a detailed fragmental perspective view of another portion of the drive mechanism of a machine;

FIGURE 10A is a fragmentary enlarged sectional view taken along line XA—XA of FIGURE 10;

Figure 15:
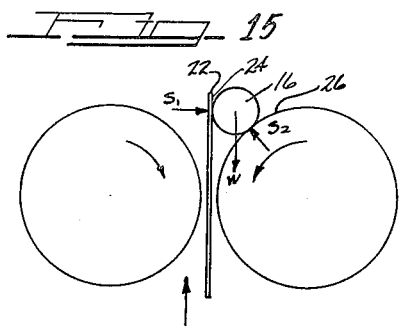
Figure 16:
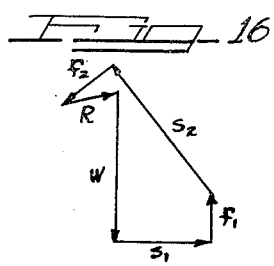
Figure 17:
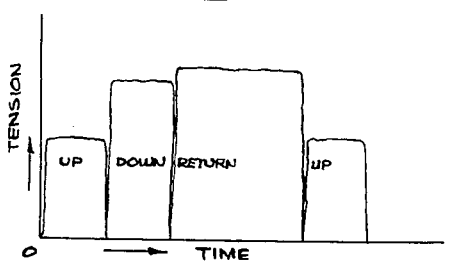

FIGURES 15 and 16 are further views similar to the pairs of views 11 and 12 or 13 and 14 again showing the force vectors and the summation of forces acting on a shrimp at a different position of machine parts;

FIGURE 17 is a graph plotting tension on the shell of a shrimp being processed versus time to illustrate the action on the shell; and FIGURES 18 and 19 are schematic views shown perspective of arrangements wherein the rollers are driven in different directions.

FIGURE 20 is a view comparable to FIGURE 1 but showing an alternative movement of the plate.

As shown on the drawings:

As shown in FIGURES 1 through 4, the elements for frictionally engaging the shrimp and removing the shells from the meat include a pair of horizontally extending parallel spaced rollers 20 and 21. In the space between them is a center plate 22 shown as preferably being in a vertical position. The center plate has frictional side surfaces 23 and 24 which extend upwardly and are shown as preferably vertical and which face the curvilinear downwardly and inwardly facing or sloping surfaces 25 and 26 of the rollers. The vertical flat planar surfaces 23 and 24 provide first friction surfaces for engaging the shrimp and the roller surfaces 25 and 26 provide downwardly sloping second friction surfaces for engaging the shrimp in coaction with the planar vertical first friction surfaces 23 and 24 so as to form a shrimp cleaning nip between them. The rollers are driven in rotation with their upper surfaces moving toward the center plate 22 in the direction indicated by the arrows 27 and 28. The center plate is moved in a unique oscillating vertical motion that is undulating in nature as shown by the arrowed line 29, which defines generally the shape of a D tilted about 90°.

Assuming point 29a to be a starting point, the plate is moved upwardly in an arcuate path to point 29b from the position of FIGURE 1 to the position of FIGURE 2. The plate is next continuously moved downwardly in an arcuate path from the point 29b to the point 29c, from the position of FIGURE 2 to the position of FIGURE 3. The plate is then moved in a horizontal path from point 29c to 29a, from the position of FIGURE 3 to the position of FIGURE 1. In other words the plate is moved in an undulating motion in a vertical plane and between each of the undulations is moved horizontally back to its starting point. The undulating motion starts and stops at a lowered position with a surface area X (FIGURE 2) along the top edge of the plate 22 and substantially co-extensive with the nip at about the horizontal diameters of the rollers so that during that portion of the travel of the center plate 22 (FIGURE 1) the shrimp will be positioned in the nip formed between the rollers 20 and 21. The undulating path of travel transports the shrimp along the rollers (or plates if plates are used) as well as coacting with the side surfaces for cleaning the shrimp. While the foregoing recites the preferred motion, the path of the plate could be a straight upward, a horizontal, a straight downward, followed by a horizontal return to the starting point, as indicated in FIGURE 20 wherein the path is indicated by 29' and other elements therein corresponding to those shown in FIGURE 1 are designated by the corresponding primed reference numerals.

In operation of the machine, a quantity of shrimp is dumped onto the rollers at a leading or a feed end thereof to be fed into the nip between the rollers by sloping shields 30 and 31, as illustrated in FIGURE 4. Each of these shields is in the shape of an inverted V with one side of the shield feeding into the nip between one set of rollers and the other side of the shield feeding into the nip between an adjacent set of rollers. Positioned above the cleaning nip of the rollers is a spray header 32 which supplies water to enhance the frictional properties of the shrimp for cleaning and to aid in washing trash downwardly. The trash falls down upon a trash plate 33 and is washed off the plate by sprays 34.

FIGURE 5 illustrates another form of the invention wherein a vertical center plate 35 oscillates in a vertical plane between side friction plates 36 and 37 provided with downwardly sloping friction surfaces 38 and 39 which face the vertical side friction surfaces of the center plate 35. In a preferred form the center plate is covered with a resilient material such as rubber 35a. The friction surfaces 38 and 39 are also preferably formed of slabs or strips of gum rubber of suitable thickness so that they can simply be bolted or clamped to the plates 36 and 37 such as by clamps 40 and 41. If a thinner layer is used it may be cemented to the plates 36 and 37 and with a thick gum rubber sheet or slab it can be bolted in place and the rubber can be turned and rotated to achieve maximum wear for cleaning and storage.

Various materials may also be used for the arrangement of FIGURES 1 through 4 but a preferred construction requires that the center plate be made of aluminum with bare surfaces, with the rolls made of polyvinyl chloride such as by telescoping polyvinyl chloride plastic pipe over metal shafting.

It is to be understood that the invention contemplates the use of either planar or curvilinear side surfaces, as set forth above (preferably both sloping inwardly and downwardly). It is further contemplated that either of these surfaces (planar or curvilinear) may be moving or stationary. For example, the machine may be operated with the rollers held stationary, although the preferred arrangements are shown. The mechanism may be designed with the side surfaces varying in surface shape from flat to curving, and with the side surfaces having motion varying from stationary to moving toward each other as described so that each surface cooperates with the shrimp and the center plate.

It should be made clear that the instant invention provides a device performing in one machine and in one operation the functions of peeling, cleaning, separating, conveying, slitting (mutilating) and tumbling (under controlled operation).

Figure 11:
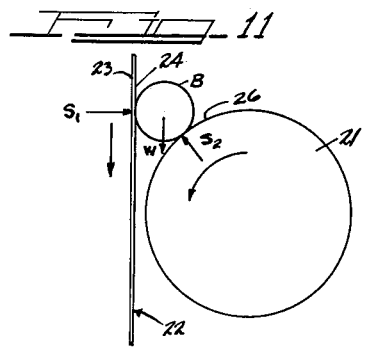
FIGURE 11 is a diagrammatic end elevational view of parts of the machine showing the force vectors on a shrimp as it is being cleaned.
Figure 12:
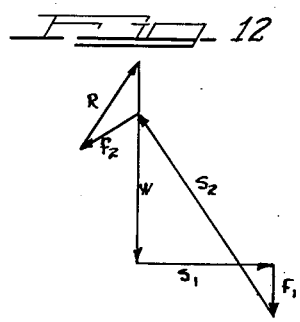
FIGURE 12 is a vector diagram showing the summation of forces acting on the shrimp.

With reference to FIGURES 11 through 17 the forces acting on the shrimp to remove the shell therefrom will be described. FIGURES 11 and 12 show the forces on a shrimp body B as the center plate 22 is moving downwardly. While, for the purposes of explanation, a rotating roller 21 is shown providing a curvilinear upper surface 26, it will be understood that most of these same forces will occur if a planar surface is used instead of a curvilinear.

Figure 14:
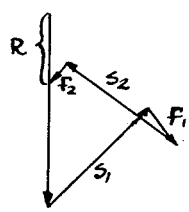

FIGURES 12, 14 and 16 are vector diagrams of the forces involved. It should be understood that they serve only as representative and are the result of projecting the vector forces on a plane crosswise to the nip line.

The static forces acting on the shrimp are its weight W, the reaction force $S_1$ between the side of the shrimp body B and the vertical first friction surface 24, and the reaction force $S_2$ between the upper sloping surface 26 of the roller on a shrimp body B. Force $S_2$ is perpendicular to a tangent at the point of contact between the shrimp B and the roller 21. Additional forces are brought into action to accomplish the ultimate performance of the process of removing the shell. This is done by the motion of the vertical friction surface 24 which has the consequence of creating friction which manifests itself as a force $F_1$ parallel to the direction of motion. A friction force $F_2$ also occurs between the surface 26 of the roll on the shrimp body B which is tangent to the roll, or, if a planar side friction surface is used, the friction force is parallel to the planar surface.

The friction force is instantaneously generated at the point of contact with the relatively moving surface as the center plate 22 moves downwardly, and at the same instance, a counter force is exerted by the other supporting surface 26 through friction to resist the initial torque and prevent rotation. Compression occurs in the direction of the surfaces which increases the values of the friction forces. If the material cannot resist compression it squashes and this increases contact areas and the shell bulges into the nip or the apex between the surfaces 24 and 26. The forces spiral in increasing magnitude until the material is compressed into the apex.

As shown in FIGURE 12, the frictional force vector $F_1$ results from the friction between the shrimp body B and the vertical surface 24, and the frictional force vector $F_2$ results from the reactant frictional force and the force due to rotation of the roll 21. A summation of the forces produces the resultant reactant force R.

Compression produces squashing of the head and forcing shell parts into the apex of the surfaces where it is then forced through the opening between the surfaces. The opening can be in the form of a physical separation or by yieldable surfaces or a surface at the point of the apex.

If the compression occurs on the meat within the shrimp when completely encased by the shell, the meat can be considered as acting as a fluid which places the shell between the points of contact on the sides opposite the apex in tension. Sufficient tension can be created to break the joints or junctures of the shell segments thus releasing the pressure and immediately creating shear forces in the interface between the resilient meat and relatively non-resilient shell materials. The smooth meat pops out and the shell is slid unwrapped and forced down into the apex and out the aperture between the surfaces.

When employing a stationary side inclined surface the same effects are obtained although with a moving side surface the action is faster and more efficient.

During downward movement of the center plate 22, if the material resists compression and maintains its shape either of the forces $F_1$ or $F_2$ may build up and exceed the frictional capacity of the juncture. Slippage then occurs and the body rotates under the torque created by the force. It is possible of course that the frictional capability of the opposite surface is not exceeded; slippage then occurs on the moving surface and rotation does not take place although the shrimp still remains in compression.

In FIGURE 11 only a single roller 21 is shown although it will be understood that the same force and effects are occurring on the other side surface 23 of the center plate with the roller on that side.

FIGURE 11, however, illustrates the fact that the peeling of the shrimp may be carried out between a first friction member 22 having a generally upwardly extending surface 24 and a second friction member 21 having a downwardly sloping surface 26 positioned relative to said upwardly extending surface 24 to form between such surfaces a shrimp engaging nip. One of the surfaces 24 having a surface area (at the location designated by the reference numeral 24 in FIGURE 11 or at X in FIGURE 2) that is substantially co-extensive with the nip; and this surface area preferably moves in a closed cycle (as indicated in FIGURES 1 through 3) from opposite the nip upwardly and downwardly back to a position opposite the nip, and then horizontally backwardly to the original position, and preferably this surface area (X in FIGURE 2 or 24 in FIGURE 11) remains at least as high as opposite the nip at all times, if there is to be continuous peeling of the shrimp between the surfaces 24 and 26.

Figure 13:
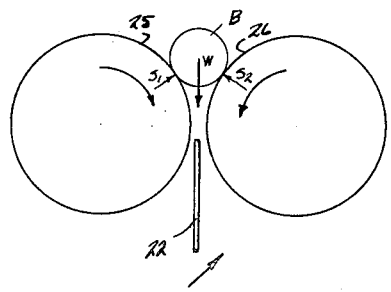
FIGURES 13 and 14 are views similar respectively to FIGURES 11 and 12 showing the force vectors and vector diagram of the summation of forces acting on a shrimp at another position of parts of the machine.

As illustrated in connection with FIGURES 13 and 14, when the center plate 22 moves sufficiently downwardly to lose contact with the shrimp, the shrimp is then in contact with the two moving curvilinear surfaces 25 and 26. The force W, and the forces $S_1$ and $S_2$ of the rollers 25 and 26 which are normal to a tangent to the roller surfaces, are the static forces acting on the shrimp body B. The tangent frictional forces $F_1$ and $F_2$ act on the body B as shown in the vector summation diagram of FIGURE 14. During this time the center plate 22 is moving horizontally in the vertical plane as shown in FIGURE 1.

In the ascendant or upward portion of the cycle, as illustrated in FIGURE 2, the forces acting on the shrimp body B are illustrated in FIGURES 15 and 16. During this upward portion of the cycle, forces are generated that are useful in the processing of the shrimp. The direction of frictional forces with respect to the vertical side surface 24 reverses. As illustrated in FIGURE 16, $F_1$ acts in a vertical upward direction while $F_2$ acts in the same direction as previously. A surface tension is created on the shell during this period of operation.

If the developed force $F_2$ is exceptionally large due to surface selection and proper lubrication, then compression R on the side of the apex is possible. Even on the upward center plate travel compression as great a magnitude as when the center plate travels down between the stationary plates can be created by proper control of the velocity of surfaces, surface materials and lubrication. Control is easier by varying the speed of rotation of the roller and degree of water lubrication. The rotating rollers can be a most effective agent in both the downward and upward movements of the plate. Of course, with a stationary side surface the foregoing discussion is applicable although the forces $F_2$ will be of a different magnitude.

FIGURE 17 illustrates the action on the shells of the shrimp bodies plotting tension on the shells as a function of time. The curves show in sequence the tension on the shells as the center plate is first moving upwardly, next moving downwardly, next returning while the opposite rollers engage the shell, and then again moving in its upward path of motion. The sequencing illustrates almost constant tension on the shells with very short breaks. This diagram is applicable when the side members are moving rollers. Stationary side members would not show a tension value in the return greater than the up or down portions.

It is contemplated that various other conditions are available by controlling the speed of rotation of the rollers simultaneously or independently and controlling the direction of the rollers. For example, FIGURE 18 illustrates an arrangement wherein rollers 42a and 44 at each side of a center plate 46 rotate in the directions respectively of the arrows 43 and 45. The roller 42a is rotating so that its upper surface moves away from the center plate 46 and the roller 44 is rotating so that its upper surface moves toward the center plate.

FIGURE 19 illustrates an arrangement wherein rollers 47 and 48 are positioned on each side of a center plate 49 and rotate in the directions shown by the arrows 50 and 51. The rollers here are rotated in such a direction that their upper surfaces move away from the center plate 49.

As above described, the wedging action of the rotating rollers into the apex formed therebetween when the center plate is returning to its lowered position, permits the choice of running the axial plane of the arrangement in either a horizontal direction, in a direction inclined in the direction of shrimp travel, or reverse inclined against shrimp travel. A preferred arrangement is as shown however with the axes of the rollers extending horizontally. The foregoing variation of arrangements are also possible with fixed side plates.

The mechanism for operating the rollers and center plates is shown in FIGURES 7, 9 and 10, and FIGURE 8 shows the mechanism wherein stationary side plates are used. The rollers are driven in rotation and the center plate is given its oscillating circulatory motion shown preferably as a circuit with a tall parabolic shaped curve with a flat bottom. While this is a preferred movement, this circuit is optional although a vertical rising and falling motion is necessary. The lateral components of the motion function additionally to move the shrimp horizontally and aid in turning the shrimp to provide a more effective cleaning action.

As shown in FIGURE 7, the shrimp are dumped into a hopper 52 at the end of the machine and move during processing to the other end of the machine wherein they drop from the first tier 53 down through chute boxes 55a to the second tier 54. They move to the other end and drop through similar chute boxes to the lower finishing tier 55 and are conveyed across the machine to the discharge chute 56a which delivers the finished shrimp meats. The chute boxes are not shown in detail as their structure will be apparent to those versed in the art, and are constructed to provide hollow vertical tubes opening downwardly from the first tier to the second tier.

The machine is constructed with a rigid frame mounted on legs 56 and cross bars such as 57 provided with hangers 58 for supporting the individual rolls 20 and 21. The rolls 20' and 21' of the second tier 54 are supported on hanger extensions 59 and in this manner the rolls are rigidly supported on the machine. The rollers are driven in rotation and the center plates 22, 22', and 71 for the three tiers are driven in their oscillating motion by cross shafts 60 and 61 rigidly mounted at the top of the machine such as by being supported at their ends in bearings 64 mounted on the frame. The shafts are driven by a motor 62 through a gear reduction 63. Cam plates 65 at the ends of the shaft 60, and 66 at the ends of the shaft 61 develop the oscillating motion for the center plates 22.

A sprocket 67 is mounted on the shaft 61 to drive a chain 68 which drives a shaft 69 and through suitable gearing 70 drives the rollers 20 and 21 in rotation. The gearing 70 is arranged so as to drive the rollers of each of the tiers.

As the shrimp move downwardly, the lower tier 55 is reserved for the finish operation. In the first portion of the last tier, the center plate 71, as shown in detail in FIGURE 6, is provided with a sharp top edge such as by a blade 72 fixed to it (the blade is not shown in FIGURE 7). The function of this sharp leading edge is to put minor cuts in the shrimp body exposing the vein and to put slices in the body meat covering the vein. The vein and slices become appendages that have to be pulled and loosened and then completely separated by further action of the next section of the center plate and side friction members. The depth of cut is determined by the amount of blade edge exposed and the momentum imparted by the center plate. Both are controllable. The preferred arrangement is for slight blade exposure with a very small amount of vertical lift and horizontal action. This makes cuts in the shrimp body exposing and possibly causing portions of the shrimp vein to protrude. The remainder of this center plate has the normal blunt leading edge and serves with the side rollers to remove the exposed appendages and deliver a completely processed shrimp to the discharge trough 56a.

The top edge or surface of the center plate is an active part throughout the machine. When the degree of sharpness of the top edge is insufficient to cut the shrimp, it strikes the shrimp on the upward swing and helps to move the shrimp along before it falls to one side or the other. It also aids in circulating the shrimp in the nip when there are several layers of shrimp. Therefore, by selection of top edge, we can predetermine its function. It varies from blunt to razor sharp.

The action of the blade 73 is a form of mutilation of the shrimp. The degree of mutilation is selective and controllable, to expose the vein for subsequent cleaning.

Each of the tiers are provided with end walking beams 73, 74 and 75, respectively, for the tiers 53, 54 and 55. The walking beams are provided at each side of the tiers, with the beams and other parts at the front side of the machine being removed in FIGURE 7 for clarity. The walking beams attach to end members 76, 77 and 78 which support the center plates 22, 22' and 71.

Separate cam plates such as 65 and 66 are attached to each of the walking beams, with plates 65 and 66 attached to beam 73, cam plates 65' and 66' attached to beam 74 and plates 65" and 66" attached to beam 75. Plate 65 is shown in detail in FIGURES 9 and 10 and each of the cam plates are of similar construction. The ends of the shafts 60 and 61 are splined, as shown at 60a for the shaft 60. The cross shafts 60 and 61 turn in opposite directions thereby contributing to a balance in driving force and vibration. The ends of the shafts are splined so that the driving connection to each of the walking beams 73, 74 and 75 can be phased with regard to the power cycles to achieve maximum power utilization and efficiency and a minimum of vibration. It will, of course, be understood that while a preferred form of drive arrangement is illustrated, other forms of drives are contemplated and for example hydraulic cylinders may be employed. It will be noted that the shafts and power connections are mounted at the top of the machine away from the water spray and positioned for ease of maintenance and accessibility. A plate, which is omitted for clarity would usually be positioned under the parts to prevent oil or grease from dripping down on the shrimp.

Each of the cross shafts 60 and 61 is provided with an off center cam 79. The cam has a center part 80 splined to the shaft portion 60a with an outer bearing part 81 which is slidable in a slot 82 on the inner face of the cam plate 65, FIGURES 7, 9 and 10.

Also mounted on the ends of the cross shafts 60 and 61 are crank arms such as 83, FIGURE 9, splined to the shaft portion 60a and having a cam follower 84 mounted on the end thereof. The cam follower 84 rides in a cam track 85 cut in the outer face of the cam plates 65. The cam track has a curved arc portion 85a and an upper horizontal portion 85b. Positioned between the crank arm 83 and the off center cam 79 is a bearing 86 which rides in a slot 87 vertically cut in the cam plate 65. The slot 87 is outwardly of the slot 82 and is wider than the diameter of the bearing 86 so as to permit the bearing 86 to shift laterally in the slot 87 when the cam 79 is moving the cam plate laterally relative to the shaft 60.

Bearing 86 rides upper end edge of slot 87 when arm 83 and cam follower 84 are vertical downward. The bearing 86 and top edge of 87 serve as a stop and facilitate transition of cam follower 84 in curved path 85a across the section common to the vertical slot 82.

In rotation of the shafts 60 and 61, the follower 84 slides in the horizontal portion 85b of the cam plate 65, vertical motion is imparted to the center plates. As the follower 84 rides through the curved portion 85a, horizontal motion is imparted to the center plates by the off center cam 79 acting on the sides of the slot 82 in the cam plate. The off center cam 79 gives horizontal forward motion when cam 84 is moving in the straight groove 85b. The cam 79 gives return horizontal motion as well as being assisted by the action of cam 84 in 85a.

The shells and debris are caught by the inclined pans 33 of each of the tiers and the spray headers 34 flush the material out from beneath the cleaning mechanism. While various sizes have been found satisfactory, a roller length of 4 feet has been proven as a successful preferred length with the rollers ranging from 2⅜" to 4½" outer diameter depending upon the size of shrimp to be cleaned.

FIGURE 8 shows a shrimp cleaning machine employing stationary side plates 36 and 37, as illustrated in the schematic arrangement of FIGURE 5. The machine is supported on legs 88 with frame members 89 and 90 arranged to carry the operating mechanism. Cross shafts 91 and 92 are connected to oscillate the center plates 35 and the shafts are driven by a motor 92a through reduction gearing. The shrimp is fed to the machine by being poured into a hopper 93 and moves toward the other end of the machine on a first tier 94 to drop down to a second tier 95, whereupon the shrimp moves the opposite end of the machine to drop down to a lower tier 96 with the cleaned shrimp being delivered out through a trough 97. The fixed side plates 36' and 37' of the second tier 95 are longer than the plates of the upper tier 94 so that the shrimp will be caught as they fall downwardly. Similarly the side plates 36" and 37" of the lower tier extend beyond the end of the plates of the second tier so that they receive the shrimp as they drop downwardly.

The cross shafts 91 and 92 connect to cam plates 98 and 99 to drive a walking beam 100 for oscillating the center plates 35 of the first tier, and drive walking beams 101 and 102 of the second and third tiers 95 and 96 through cam plates 103 and 104 respectively.

It will be understood that in some instances the machines may be arranged in a single elongated tier or in other arrangements the tiers may be alternated with some tiers using fixed side plates and other tiers using rollers.

The shrimp automatically feeds from the hopper down to the shrimp cleaning mechanism, and if it appears that the weight on the shrimp at the bottom of the pile is too great, the angle of repose A (FIGURE 4) of the hopper shields can be reduced toward a horizontal position to reduce the rate of feed. Feeding of the machine thus continues uniformly while shrimp is dumped into the hopper and the shrimp is conveyed along each of the tiers by the horizontal component of motion of the rising and falling center plates.

In brief summary, with reference to FIGURES 1 through 4 and 7, shrimp is dumped into the hopper 52 and is fed along the horizontal rotating rollers 20 and 21 by the oscillating motion of the center plate 22 which moves along the path indicated by the arrowed line 29. The center plate performs a dual function in coacting with each of the individual rollers to remove the shells from the shrimp and convey it horizontally. The three stages of movement of the center plate are illustrated in FIGURES 1 through 3 with the plate following the path having the vertical parabolic arcuate motion in rising and falling and the horizontal return motion.

Thus it will be seen that we have provided an improved shrimp cleaning machine which meets the objectives and advantages hereinabove set forth. The machine provides an effective efficient shrimp cleaning unit well adapted to smooth continuous effective operation.

The drawings and specification present a detailed disclosure of the preferred embodiments of the invention, and it is to be understood that the invention is not limited to the specific forms disclosed, but covers all modifications, changes and alternative constructions and methods falling within the scope of the principles taught by the invention.

In conclusion it will be seen that the instant invention provides a machine for separating the hulls from the meat or shrimp comprising a planar shrimp separating member (e.g. 22 or 35), at least one other shrimp separating member (e.g. 21 or 37) operatively associated with the planar member to define a peeling nip (line), and means associated with one (e.g. 22 or 35) of said members to cause relative bodily reciprocatory movement between said members to separate the hulls from the meat of said shrimp. One aspect of the invention involves the unique reciprocatory movement, which comprises cyclic movement in the plane of such nip by one (e.g. 22, 35) of said members forwardly and into said nip, then backwardly in general alignment with the nip, and finally away from the nip and forwardly, whereby movement of the shrimp in a generally forward direction is accomplished during such cyclic movement. Another aspect of the instant invention involves the use of an upwardly extending (preferably vertical) planar shrimp peeling member (22, 35) in the instant device. The upwardly extending planar separating member (22, 35) is the member which preferably is moved through the cycle. Although the preferred vertical alignment is shown herein, it will be appreciated that the planar surface 22, 35 can be upwardly extending at an angle from the vertical, and in this respect it will be appreciated that an important advantage of the instant invention is obtained by a generally downward movement of one of the members in the forward-and-into-nip phase of the cycle. Among other things, this movement takes advantage of the use of the weight of the shrimp bodies to assist in the pinching and peeling action at the nip.

It will be understood that modifications and variations may be effected without departing from the spirit and scope of the novel concepts of the present invention.

We claim as our invention:

1. A machine for cleaning shrimp comprising in combination a pair of side members generally defining an elongated nip therebetween, at least one of which side members having an inwardly and downwardly inclined surface sloping toward said nip, a center plate having at least one generally vertical side surface facing the aforesaid sloping surface, and means operatively associated with said center plate for moving the center plate vertically relative to the side member in the nip defined therebetween for frictionally removing shells from shrimp between said sloping surface and said generally vertical side surface by frictional engagement of the shrimp at said nip.

2. A machine as claimed in claim 1 wherein at least one of said side members has an inwardly and downwardly inclined surface formed by a roller.

3. A machine as claimed in claim 2 having means associated with said roller for rotating the inwardly and downwardly inclined surface thereof toward said nip.

4. A machine for cleaning shrimp comprising in combination a pair of side members generally defining an elongated nip therebetween, at least one of which side members having an inwardly and downwardly inclined surface sloping toward said nip, a center plate having at least one generally vertical side surface facing the aforesaid sloping surface, and means operatively associated with at least said one of said side members for effecting relative movement of the center plate vertically with respect to the side members in the nip defined therebetween for frictionally removing shells from shrimp between said sloping surface and said generally vertical side surface by frictional engagement of the shrimp at said nip.

5. A machine for processing shrimp comprising a first friction member having a generally upwardly extending surface, a second friction member having a downwardly sloping surface positioned relative to said upwardly extending surface to form between such surfaces a shrimp engaging nip, one of said surfaces having a surface area substantially coextensive with said nip, and means operatively associated with one of said members for moving said surface area in a closed cycle from opposite said nip upwardly and then downwardly back to a position again opposite said nip, while at all times remaining at a level at least as high as opposite to the nip.

6. A machine for processing shrimp comprising a first friction member having a generally upwardly extending surface, a second friction member having a downwardly sloping surface positioned relative to said upwardly extending surface to form between such surfaces a shrimp engaging nip, said first friction member having a planar surface area substantially coextensive with said nip, and means operatively associated with said first friction member for moving said surface area in a closed cycle from opposite said nip upwardly and then downwardly back to a position again opposite said nip, while at all times remaining at a level at least as high as opposite to the nip.

7. A machine as claimed in claim 6 wherein said second friction member is a roller provided with means associated with the roller for rotating the roller such that its downwardly sloping surface moves toward the nip.

8. A machine for processing shrimp comprising a first friction member having a generally upwardly extending surface, a second friction member having a downwardly sloping surface positioned relative to said upwardly extending surface to form between such surfaces a shrimp engaging nip, one of said surfaces having a surface area substantially coextensive with said nip, and means operatively associated with one of said members for moving said surface area relative to said nip in a closed cycle from opposite said nip upwardly and then downwardly back to a position opposite said nip but forwardly of its original position, and then to complete the cycle backwardly and generally horizontally to its original position.

9. A machine for processing shrimp comprising a first friction member having a generally upwardly extending surface, a second friction member having a downwardly sloping surface positioned relative to said upwardly extending surface to form between such surfaces a shrimp engaging nip, said first friction member having a surface area substantially coextensive with said nip, and means operatively associated with said first friction member for moving said surface area in a closed cycle from opposite said nip upwardly and then downwardly back to a position opposite said nip but forwardly of its original position, and then to complete the cycle backwardly to its original position, while at all times remaining at a level at least as high as opposite to the nip.

10. A machine as claime in claim 9 wherein the upwardly extending surface is planar.

11. A machine as claimed in claim 10 wherein the second friction member is a roller which provides the aforesaid downwardly sloping surface.

12. A machine for processing shrimp comprising a first friction member having an upwardly extending surface, a second friction member having a downwardly sloping surface in nip-defining relationship with said first friction member, one of said members having an elongated surface area parallel to said nip facing the other of said members and said area being movable in a closed cycle upwardly and downwardly relative to the nip with the entire length of said surface area having substantially uniform movement relative to said nip, and means for effecting relative movement between said members whereby said elongated surface area may carry out movement in said closed cycle.

13. A machine for processing shrimp comprising a first friction member having an upwardly extending surface, a second friction member having a downwardly sloping surface defining a nip with the aforesaid upwardly extending surface for engaging shrimp therebetween, one of said members having an elongated surface area parallel to said nip facing the other of said members and movable in a closed cycle upwardly and forwardly, then downwardly and forwardly, and finally in a generally horizontal movement back to its original position relative to the nip, with the entire length of said surface area having uniform movement relative to the nip during the entire cycle, and means for effecting relative movement of said members through said cycle.

14. A machine for processing shrimp comprising a first friction member having a generally vertical planar surface, a second friction member having a surface positioned relative to said vertical planar surface to form a generally horizontal shrimp engaging nip therebetween, one of said members having an elongated surface area generally parallel to said nip facing the other of said members and moveable in a closed cycle upwardly and forwardly, then downwardly and forwardly, and finally generally horizontally back to its original position in the cycle relative to the nip with the entire length of said surface area having uniform movement relative to the nip during such cycle, and means connected to said members for effecting relative movement therebetween through said cycle.

15. A machine for processing shrimp comprising a first friction member having a generally vertical planar surface, a second friction member having a surface positioned relative to said vertical planar surface to form a generally horizontal shrimp engaging nip therebetween, one of said members having an elongated surface area generally parallel to said nip facing the other of said members and movable in a closed cycle upwardly and forwardly, then downwardly and forwardly, and finally generally horizontally back to its original postion in the cycle relative to the nip with the entire length of said surface area remaining at all times at least as high as opposite to the nip during said cycle, and means connected to said members for effecting relative movement therebetween to carry said surface area through said cycle.

16. A machine for cleaning shrimp comprising in combination a pair of spaced parallel horizontal rollers, a center plate having vertical side surfaces facing the rollers and movable vertically in the space between said rollers, means for rotating the rollers with the upper surfaces moving toward the side surfaces of the plate, and means for moving the center plate relative to the rollers in a vertical oscillating path of travel between the rollers with said path extending from a starting point at a lowered horizontal elevation and extending upwardly to an elevated position and returning to said lowered position and simultaneously moving laterally to ascribe an arcuate path, and returning horizontally to said starting point so that shrimp will be cleaned and carried forward toward one end of the rollers.

17. A machine for cleaning shrimp comprising in combination a pair of spaced parallel horizontal rollers, a center plate having vertical side surfaces facing the rollers and movable vertically in the space between said rollers, means for rotating the rollers with the upper surfaces moving toward the side surfaces of the plate, means for moving the center plate relative to the rollers in a vertical oscillating path of travel between the rollers with said path extending from a starting point at a lowered horizontal elevation and extending upwardly to an elevated position and returning to said lowered position and simultaneously moving laterally to inscribe an arcuate path, and returning horizontally to said starting point so that shrimp will be cleaned and carried forward toward one end of the rollers, and spray headers positioned above said center plate and rollers for directing a spray of water downwardly.

18. A machine for cleaning shrimp comprising in combination a pair of parallel side members having inwardly and downwardly inclined sloping surfaces with a space therebetween, a center plate having vertical side surfaces facing the sloping surfaces of the side members, and means for moving the center plate vertically relative to the side members for frictionally removing shells from shrimp therebetween.

19. A machine for cleaning shrimp comprising in combination a pair of parallel side members having at least one inwardly and downwardly inclined sloping surface with a space therebetween, a center plate having a vertical side surface facing the sloping surface, and means for moving the center plate vertically relative to the side members for frictionally removing shells from shrimp therebetween.

20. A machine as claimed in claim 18 wherein the sloping surfaces are planar.

21. A machine as claimed in claim 18 wherein the parallel side members are rollers which present the aforesaid downwardly sloping surfaces.

22. A machine as claimed in claim 18 wherein the parallel side surfaces are formed of polyvinyl chloride.

23. A shrimp processing machine comprising an upper cleaning tier and a lower cleaning tier, said tiers having a shrimp receiving end and a discharge end with a discharge end of said upper tier positioned to discharge to the receiving end of the lower tier, and each tier including a pair of parallel side members having inwardly and downwardly inclined sloping surfaces with a space therebetween, a center plate having vertical side surfaces facing the sloping surfaces of the side members, and means for moving the center plate vertically relative to the side members for frictionally moving shells from shrimp therebetween.

24. A machine for cleaning shrimp comprising in combination a pair of side members generally defining an elongated nip therebetween, at least one of which side members having an inwardly and downwardly inclined surface sloping toward said nip, a center plate having at least one generally vertical side surface facing the aforesaid sloping surface, means operatively associated with said center plate for moving the center plate vertically relative to the side members in the nip defined therebetween for frictionally engaging the shrimp between said sloping surface and said generally vertical side surface and also operatively associated with said center plate to effect a relative horizontal movement between said center plate and said side members to advance shrimp from a receiving end of the nip to a discharge end of the elongated nip, and a sharpened cutting edge located on the upper edge of the first friction member for placing small cuts in the body of the shrimp being processed.

25. A machine for cleaning shrimp comprising in combination a pair of parallel horizontal rollers, a center plate having vertical side surfaces facing the rollers and movable between said rollers, means for rotating the rollers with their upper surfaces moving toward the side surfaces of the plate, and means for moving the center plate relative to the rollers in a vertical oscillating movement between an elevated position so that the side surfaces horizontally face the upper surfaces of the rollers to frictionally engage shrimp between the side surfaces and the rollers, and a lowered position wherein individual shrimp are frictionally engaged by both rollers.

References Cited in the file of this patent

UNITED STATES PATENTS

| | | |
|---|---|---|
| 983,384 | Matzat | Feb. 7, 1911 |
| 2,631,627 | Pierson | Mar 17, 1953 |
| 2,712,152½ | Samanie | July 5, 1955 |
| 2,784,450 | Jonsson | Mar. 12, 1957 |
| 2,834,040 | Martinez | May 13, 1958 |
| 2,858,563 | Rodriguez | Nov. 4, 1958 |
| 2,988,771 | Lapeyre et al. | June 20, 1961 |